May 13, 1969 KATSUYA ATSUMI 3,443,812

TAPE DRIVE CONTROL MECHANISM FOR MAGNETIC TAPE RECORDERS

Filed March 1, 1966 Sheet 2 of 4

TAPE DRIVE CONTROL MECHANISM FOR MAGNETIC TAPE RECORDERS

Filed March 1, 1966 Sheet 4 of 4

United States Patent Office 3,443,812

Patented May 13, 1969

3,443,812

TAPE DRIVE CONTROL MECHANISM FOR MAGNETIC TAPE RECORDERS

Katsuya Atsumi, Tokyo, Japan, assignor to Akai Electric Company Limited, Tokyo, Japan Filed Mar. 1, 1966, Ser. No. 530,818

Claims priority, application Japan, Mar. 3, 1965, 40/12,058; May 24, 1965, 40/30,341

Int. Cl. G11b *15/44*

U.S. Cl. 274—4 4 Claims

ABSTRACT OF THE DISCLOSURE

A tape drive control arrangement for a magnetic recorder having push buttons controlling tape reeling mechanisms and brakes, and a tape tension condition sensing arm for sensing the end, breaking, or undue slacking of the tape, includes a spring biased pivotal tape fluctuation suppression arm with a guide contacting the tape on the opposite side of the tape from the sensing arm when the push buttons have been operated to release the brake and operate the tape reeling motors. A spring normally urges the tape fluctuation suppression arm away from the tape in the rest position where the brakes are applied and the reeling motors are shut off. A by-pass circuit around a manual switch includes an electromagnetic plunger operated switch controlled by a tape tension condition sensing arm switch through a time delay and a brake position sensing switch so that even when the manual switch has been opened, winding of the tape can be completed on either reel.

This invention relates to improvements in tape drive control mechanisms for push-button controlled magnetic tape recording and reproducing machines which will be referred to as "tape recorders" hereinafter.

Various efforts have been devoted to provide automatic stop mechanisms in tape recorders which utilize a pivotable tension arm for sensing the termination breaking or considerable slackening of magnetic tape while running and actuating an automatic mechanism for stopping the operation of the tape recorder.

In conventional tape recorders which are provided with an automatic stop mechanism employing a pivoted tension arm, a drawback has been encountered in that even after the tension arm has sensed a condition of the tape reeling mechanism, the reeling mechanism may be actuated again if the user of the tape recorder should depress either intentionally or unintentionally one of the tape drive control buttons.

It is therefore another object of the present invention to provide a tape drive control mechanism of the kind above referred to, capable of conditioning the tape drive control buttons for operating and initiating the desired tape drive only when the condition of the tape is again in its regularly threaded and tightened operative state.

Still another difficulty has been encountered with use of conventional tape recorders in that on account of various sizes of standardized tape reels ranging from 2 to 10 inches, the tape running direction will vary considerably, especially after passage through the capstan-and-pressure roller mechanism for delivery of the tape at a predetermined constant speed; and the variation in the tape running direction at the above-mentioned zone in advance of the tape wind-up reel, with increase or decrease of the amount of tape spool on the reel, will substantially affect the sensing performance of the tension arm.

Still another object of the present invention is therefore to provide an improved tape drive control mechanism for obviating the last mentioned drawback inherent in the conventional tape recorders fitted with a tension-arm controlled automatic stop mechanism.

These and further objects, features and advantages of the present invention will appear from the following detailed description taken with reference to the accompanying drawings illustrative of a preferred embodiment of the invention.

Figure 1:
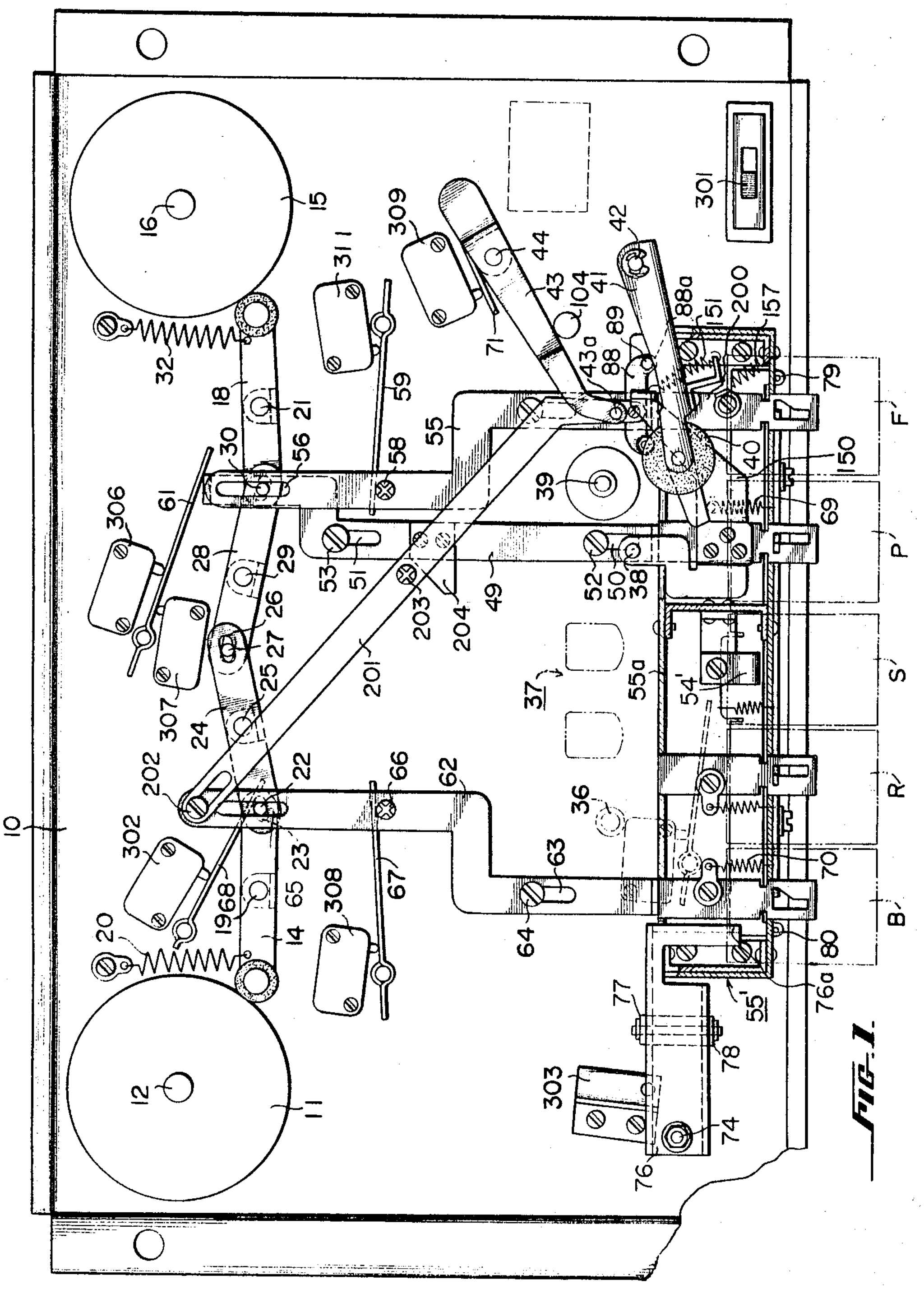
FIG. 1 is a schematic top plan view, partially sectioned, of a chassis panel of a tape recorder fitted with the tape drive control mechanism according to this invention with its control push buttons kept in their non-operating position.

Now referring to the accompanying drawings, a chassis panel 10 of the tape recorder rotatably mounts a tape feed turn disc 11 fixedly attached with a shaft 12. This shaft 12 passes rotatably through the panel 10 and is coupled at its lowermost end with a drive electric motor 13, see FIG. 11. This shaft 12 may, if necessary, be provided with a friction clutch and a brake arm 14 is provided so as to cooperate with the peripheral surface of the disc 11, or that of the lower element of the clutch, as the case may be.

A take-up turn disc 15 which is fixedly attached to its shaft 16 which rotatably passes through the panel 10. The shaft 16 is coupled at its lowermost end with a wind-up motor 17 only schematically shown in FIG. 11. If necessary, the shaft 16 may be fitted with a friction clutch at an intermediate point between its ends. Brake arm 18 is positioned so as to frictionally cooperate with the periphery of the turn disc 15, or the upper element of the friction clutch, said element being formed integrally with the disc 15, although not shown.

Brake arm 14 is pivotable about a pivot pin 19 which is rigidly studded on the panel 10, said arm being urged by a spring 20 so as to be normally kept in its brake-applying position shown in FIG. 1.

Brake arm 18 is pivotably mounted about a pivot pin 21 again rigidly studded on panel 10. There is also provided an urging spring 32 for normally keeping the arm 18 in its brake-applying position shown in FIG. 1.

Under these conditions both turn discs 11 and 15 are normally kept in their braked condition. A first connecting pin 22 is fixedly mounted on the non-operating end of brake arm 14 and slidably received in an elongated slot 23 formed in one end of a connecting link 24. The link 24 is pivotable at 25 and formed at another end with an elongated slot 26 for slidably receiving a connecting pin 27 which is fixedly attached at one end of a second connecting link 28 pivotable at 29. The second link 28 and the second brake arm 18 are connected pivotably with each other by means of a pin-and-groove connection 30. It will be clear from the foregoing that a brake system is constituted by brake arms 14, 18 and connecting links 24, 28, wherein these four elements are connected with one another with considerable play in their longitudinal direction. Although not shown, pins 22, 27 and 30 are provided with spring clips for preventing unintentional disengagement from the respective cooperating slots.

Figure 2:
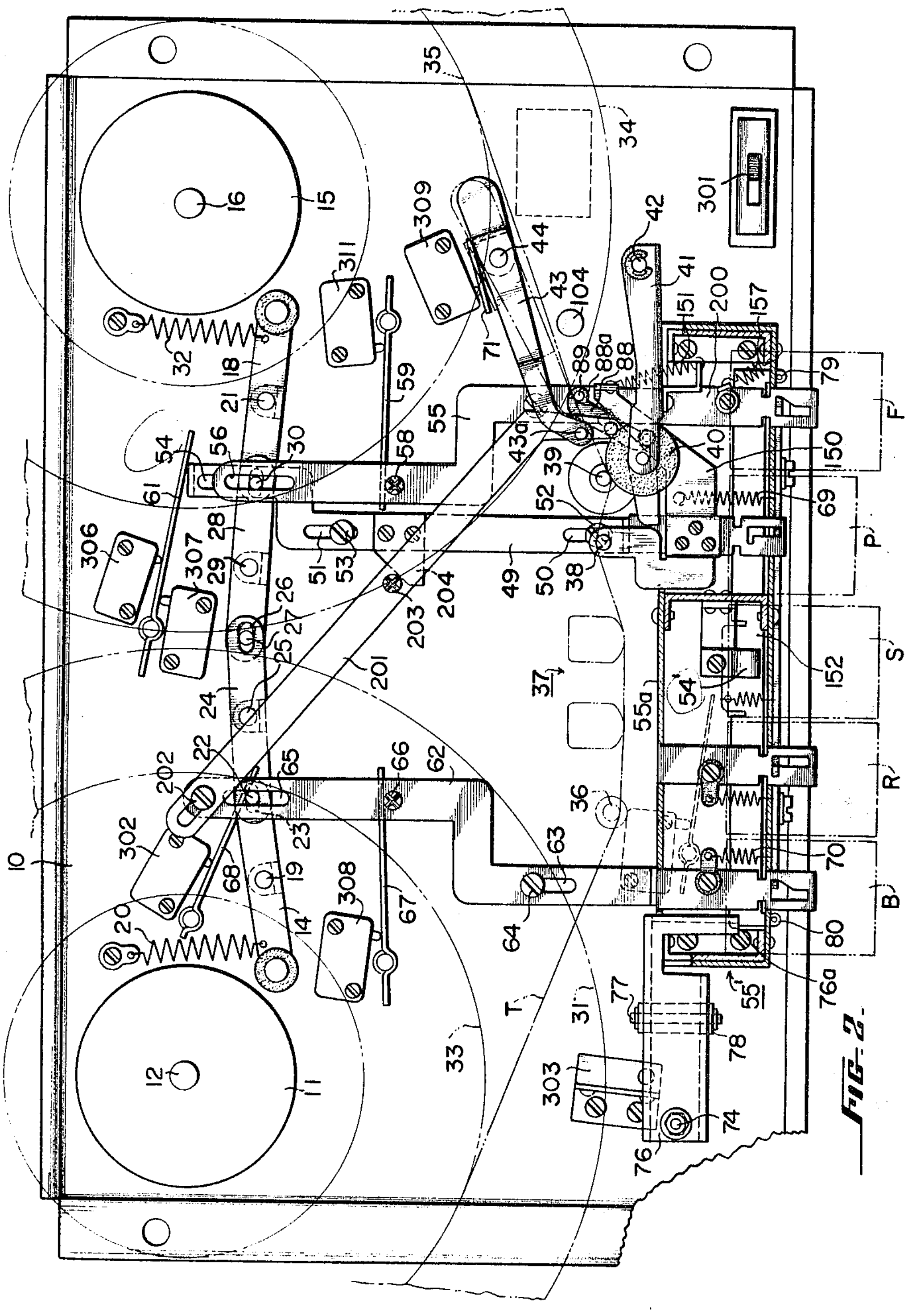
FIG. 2 is a similar view to FIG. 1 wherein the tape has been threaded in the manner ready for operation and a play control button has been depressed.

A plurality of tape drive control buttons F, P, S, R and B are mounted pivotably on the panel 10 substantially along the lower edge thereof when seen in FIGS. 1 and 2 and only schematically shown therein by chain-dotted lines in their outline configuration.

Button F is for fast forward drive of a magnetic tape T (FIG. 2); button P for playing or reproducing service; button S for stop control; button R for recording and button B for rewinding service, respectively, as will be described more fully hereinafter.

As is conventional, the turn disc 11 frictionally mounts a tape reel 31, having a spool as at 33 of the tape T only schematically shown by chain-dotted lines in FIG. 2. The turn disc 15 mounts frictionally a tape reel 34, having a spool as at 35 of the tape T which has been threaded from spool 33 around guide post 36; magnetic head group 37; movable guide post 38; capstan 39 adapted for cooperation with pressure roll 40 mounted on arm 41 which is pivotable at 42; and tension arm 43 pivotably mounted at 44 below the reel 34. This tension arm 43 carries at its free end a feeler pin **43*a* to be kept against the tape T. The capstan 39 passes rotatably through the panel 10 and directly coupled with a main drive motor 45** which is shown only schematically in FIG. 11.

Figures 3, 4, 5, 6:
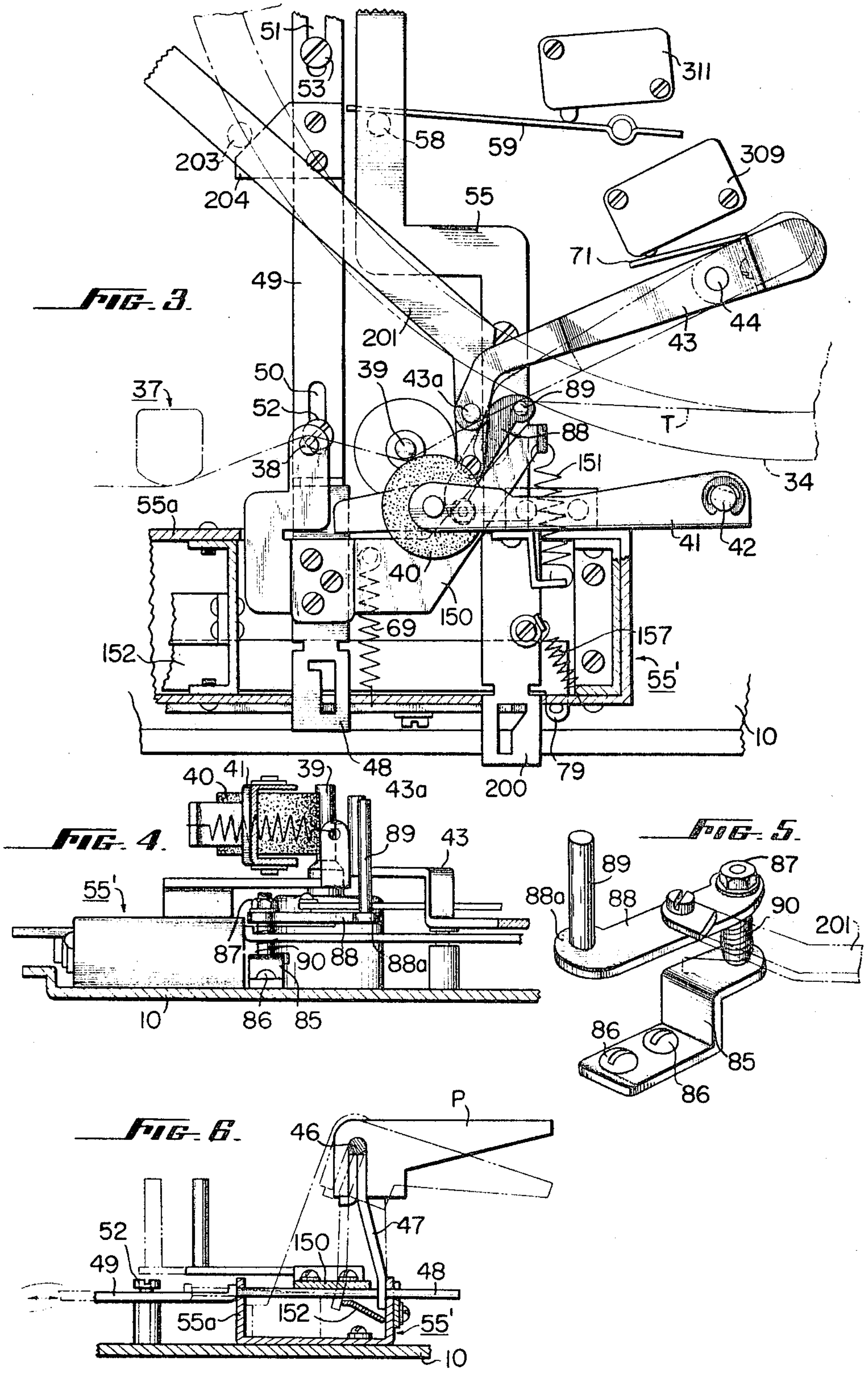
FIG. 3 is an enlarged partial view of FIG. 2.
FIG. 4 is a side view of a capstan and a pressure roller kept in operative contact therewith, as well as several related parts shown partially in section.
FIG. 5 is a perspective view of an auxiliary and pivotable tape guide post employed.
FIG. 6 is a side view, partially sectioned, of a play control or reproducing push button and its related several parts.

As shown in FIG. 6, play control button P is pivotable about an elongated support bar 46 which is arranged in common to all the push buttons, although not specifically shown. Button P is provided with a depending stem 47 which is mechanically coupled with a slide 48 capable of shifting in a horrizontal plane and rigidly connected with an operating bar 49 at its end. For guiding the movement of this bar, the latter is formed with elongated slots 50 and 51 receiving slidably guide pins 52 and 53 (FIGS. 1 and 2), respectively, which are studded on the panel 10. The opposite end of the bar 49 is linked to the connecting pin 30 for cooperation therewith through an elongated slot 54.

Figure 11:
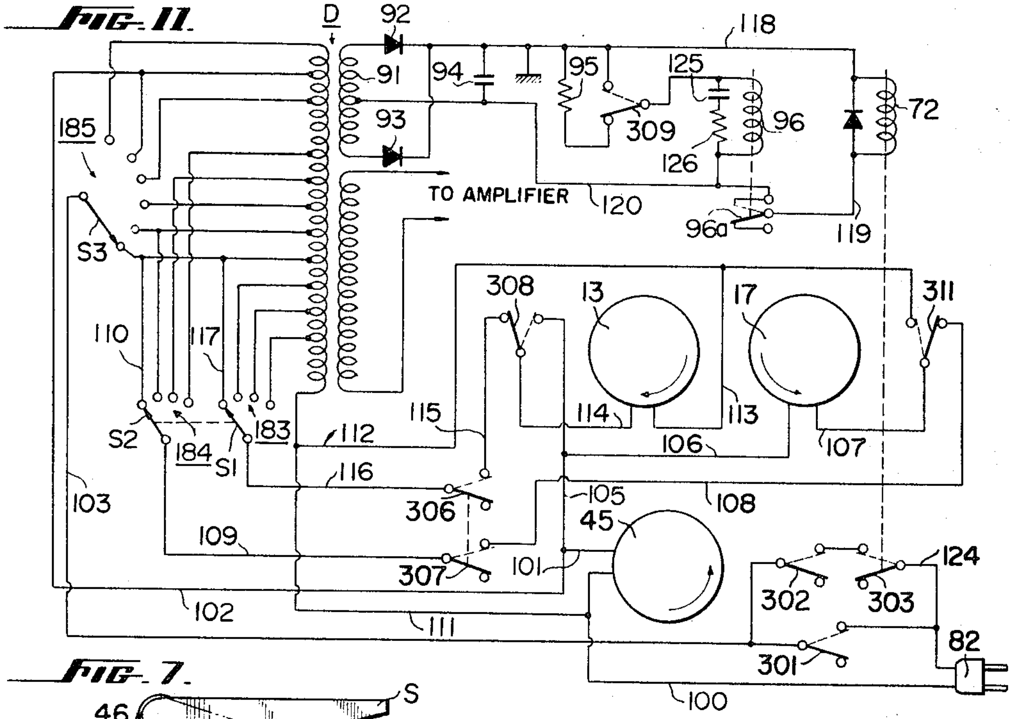
FIG. 11 is a wiring diagram of an electric circuit comprising several tape drive motors, the aforementioned electromagnetically operated plunger and other related parts.

Two microswitches of duplicate type 306–307 are provided so as to be controlled through the intermediary of a pivotable spring plate 61 from the free end of operating bar 49, these switches 306 and 307 being also illustrated in the circuit shown in FIG. 11.

Slide 48 is attached to a lateral arm 150, and a spring 151 is tensioned between the arm 150 and the pressure roller arm 41.

When the play control button P is depressed as shown by corresponding chain-dotted line in FIG. 6, the slide 48 and its lateral arm 150 are advanced from right to left in FIG. 6, causing thereby the pressure roller arm 41 to turn clockwise in FIG. 1 so that the pressure roller 40 is brought into engagement with capstan 39, as clearly seen in FIG. 2.

In the normal operating condition wherein the tape T is threaded in the aforementioned way and as shown in FIG. 6, an elongated lock bar 52 is turned counter-clockwise against spring action, which will be described more in detail hereinafter, in the course of the depressing manipulation of the button P. The button P is then kept in its locked condition by the abutting engagement of bar 152 with the stem 47. This locked position of the button P is clearly shown in FIG. 6 by chain-dotted lines.

Stop button S is also formed with a depending leg 53′ and is resiliently urged by a spring 54′ against a side wall of an elongated small frame 55′ having a channel-shaped cross-section as shown in FIGS. 1–3 and 6–7 and fixedly mounted on the panel 10. This button serves, when depressed, for swiveling the lock bar 152 counter-clockwise in FIGS. 6–7 so as to release any one or more locked push buttons, if any. When the depressing finger pressure is released, stop button S will automatically return to its resting position under the influence of return spring 54′.

Fast forward drive control button F has a construction substantially similar in principle with that of button P, except the related parts thereof for cooperating with the pressure roller arm 41. An operating bar 55 is linked at its rear end to the button F and formed at its front end with an elongated slot 56 which receives slidably the aforementioned pin 30.

A pin 58 is fixedly attached to the operating bar 55 for the control of a microswitch 311 through the intermediary of a pivotable spring plate 59 for energizing or de-energizing the tape winding motor 17. See FIG. 11.

Record control button R is provided with a stem and a slide coupled therewith, similar to those of the play control button P, but not with any operating bar linked with the brake mechanism proper. This button R serves for switching amplifiers and the like electronic components, not shown, of the tape recorder, and a recording operation can be initiated by depressing both buttons P and R, simultaneously.

Rewinding control button B is rigidly connected with operating bar 62 having an elongated slot 63 which receives slidably a guide pin 64 studded on panel 10. The forward end of the bar 62 is also formed with a slot 65 kept in slidable engagement with pin 22 for establishing link connection with the brake system.

Operating bar 62 mounts fixedly a pin 66 serving for the control of a microswitch 308 through the intermediary of pivotable spring plate 67, said switch 308 being provided for initiating and stopping the operation of tape feed motor 13 as shown in FIG. 11.

A further microswitch 302 is provided as shown for on-off control of main drive motor 45, which switch is in turn operated by pin 22 (FIGS. 1 and 2) through the intermediary of a pivotable spring plate 68.

Figures 7, 8, 9:
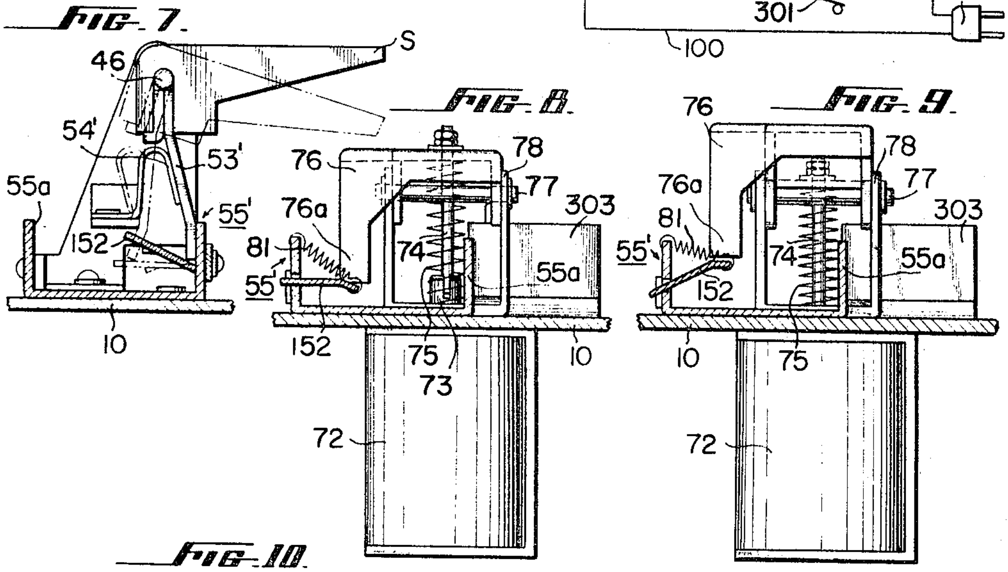
FIG. 7 is similar view to FIG. 6, illustrative of a stop control push button and its related several parts.
FIGS. 8 and 9 are end views of an electromagnetic plunger assembly employed, several parts thereof being however shown in section.
Figure 10:
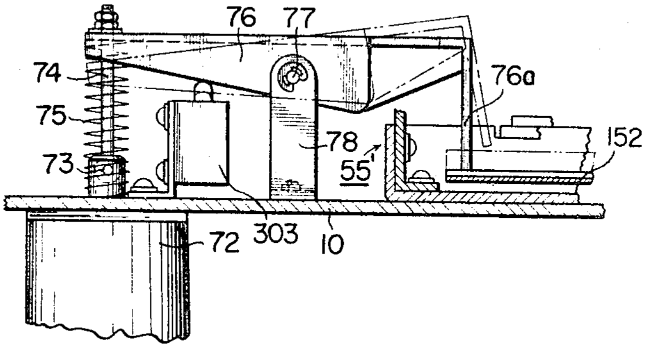
FIG. 10 is a side view, partially sectioned, of the plunger assembly.

Return springs 157, 69 and 70 are provided for operating arms 55, 49 and 62, respectively. Tension arm 43 is provided with a spring arm 71 for the control of a microswitch 309 which is inserted in the circuit shown in FIG. 11 for energizing and de-energizing an electromagnet 72, shown in FIGS. 8–11, fixedly mounted and depending from the lower surface of chassis 10. Magnet 72 is adapted to actuate its plunger 73 to which is linked a vertical rod 74 urged in the upward direction by means of a compression spring 75. The rod 74 is linked with a pivotable releaser 76 which is mounted about a pivot shaft 77 mounted in turn in the upper end of a stand 78. This stand is, as shown in FIGS. 8–10, fixedly mounted on the chassis panel 10. A depending arm **76*a* is formed integrally with the releaser 76 and kept in pressure contact with one end of lock bar 152 which is pivotable about two hinge points 79 and 80. A return spring 81 is provided as shown in FIGS. 8–9 so as to urge the bar 152 toward its locking position illustrated in FIG. 9. A main switch 301 is mounted on the right-hand lower corner of the panel 10 in FIGS. 1 and 2 and inserted in the circuit shown in FIG. 11 so as to manually on-off control of the circuit which is adapted to be connected through the intermediary of a plug 82** to an A.C. current source, not shown.

Especially seen from FIG. 5, a substantially Z-shaped mounting piece 85 is fixedly mounted on the chassis panel 10 by means of fixing screws 86 and an upright pin 87 is fixedly attached onto the free end of the piece 85, around the latter a pivotable tape fluctuation suppression arm 88 is mounted. A coil spring 90 is wound around the pin 87 and fixed with its one end to the piece 85 and with another end to the root of the pivotable arm 88, thereby exerting a resilient torque upon the latter in the clockwise direction when seen in FIG. 5, or in the counter-clockwise direction from its operating position shown in FIG. 2 to its idle or retarded position shown in FIG. 1.

In the latter case, a rounded projection 88a is kept in abutting engagement with the inner side wall 55a of small frame 55'. In close proximity of this abutting projection 88a, there is fixedly mounted a guide pin 89 on the pivotable arm 88, adapted for contact with the tape T in proximity of a feeler 43a on tension arm 43, when the pivotable arm 88 has been brought into its operating position as shown in FIG. 2.

Although not shown, an operating shoulder is formed at the marginal zone between slide 200 and the operating bar 55, so as to turn the pivotable arm 88 around its pivot pin 87 from its off-service position to its operating position, when fast forward feed control button F has been depressed.

One end of diagonal bar 201 is linked to the pivotable arm 88 as clearly seen from FIG. 5, while the opposite end of the bar 201 is linked at 202 with operating bar 62 at its forward end. Therefore, when push button B is depressed, the diagonal bar 201 is pulled from the side of operating bar 62 so that the pivotable arm 88 is turned again from its off-service position to its operating position.

Diagonal bar 201 is provided at its intermediate point between the end extremities with a follower pin 203, while operating bar 49 is formed with a cam piece 204, with which said pin 203 is always kept in pressure contact, under the influence of resilient force provided by return coil spring 90 shown in FIG. 5. Therefore, when play control button P is depressed so as to advance the operating bar 49, urging force is transmitted therefrom through follower pin 203 and cam 204 to diagonal bar 201 so that again in this case the pivotable arm 88 may be swiveled from its off-service position to its operating position.

The operation is as follows:

When it is desired to operate the tape recorder, the combined selector switch S1–S2 and the single selector switch S3 (FIG. 11) are adjusted beforehand manually to suitably selected mating tapes 183, 184 and 185, respectively, so as to meet the occasional load condition of the machine which varies depending upon the tape reel size. By manipulate these switches in the clockwise direction in FIG. 11, the load condition may accommodate smaller size reels, and vice versa. Then, plug 82 is connected to an A.C. power source and main switch 301 is manually closed from its full line to dotted line position as shown in FIG. 2. Current will therefore flow from plug 82 through conductor 100, main motor 45, conductors 101 and 102, selected one of tapes 185, switch S3, conductor 103 and now closed switch 301 back to plug 82, thus the motor 45 is energized and the capstan 39 is kept in rotation at a predetermined speed and in the counter-clockwise direction in FIG. 1.

Next, tape feed reel 31 and tape wind-up reel 34 are placed on the turn discs 11 and 15, respectively, and the tape end drawn out from the wound tape spool 33 is threaded as in the aforementioned way to the wind-up reel. In this case, however, the tape T is generally in its loosened state so that the tension arm 43 is resiliently kept in engagement with a stop pin 104 studded on the panel, under the influence of resilient force exerted from within the interior of switch 309 which is provided as conventionally with a returning spring and a push button urged thereby, although not appearing in the drawings. Naturally, this push button of the switch is kept in resilient engagement with the actuator spring 71 projecting from tension arm 43. Under these conditions, the switch 309 is in its position as shown by full line in FIG. 11.

Current therefore will be supplied from the primary side of transformer D to rectifier circuit including secondary coil element 91, diodes 92 and 93 and ripple-suppressing condenser 94, thence through resistor 95 and switch 309 to relay coil 96. On account of the insertion of said resistor 95, the relay coil 96 is not fully actuated and its contact 96a is kept in off-position shown by full line in FIG. 11 so that electromagnetic plunger 72 is not actuated. In this case, switch 303 is kept in its off-position as shown by full line in FIG. 11, which means that lock bar 152 is kept in its non-lock position.

Under these conditions, any one of push buttons F, P, S, R and B cannot be locked after release of a finger pressure applied thereto for intentional and selective control of operation of the machine. Therefore, the tape recorder cannot be operated for an extended time period, unless one of the three push buttons F, P and B is kept continuously depressed by a finger pressure.

Even when tape reels 31 and 34 are placed on respective turn discs 11 and 15, respectively and the tape end is threaded from spool 33 through several parts including tension arm feeler 43a to wind-up reel 34 in the aforementioned way, the arm 43 is kept in engagement with stop pin 104 as before, on account of the generally slackened condition of tape T.

Now assuming that the play button P is depressed so as to initiate a play-back operation of the machine, operating lever 49 is advanced in the upward direction when seen in FIG. 1, thereby the connecting pin 30 being moved upwardly for turning, at first, brake arm 18 against spring action 32 in the releasing or clockwise direction in the same figure. This releasing operation is transmitted through connecting links 28 and 24 to another brake arm 14 which is thus caused to turn against spring action 20 in its releasing direction with a short time lag in comparison with the release of the first brake arm 18. Thus, the both reel shafts 12 and 16 are kept in their freely rotatable condition.

With advance of lateral arm 150 caused by the said manual depression of play button P, arm 41 is rotated clockwise in FIG. 1 so as to bring pressure roller 40 in pressure contact with now rotating capstan 39 with the tape T kept pinched therebetween, thereby the tape being fed in its forward drive direction at a predetermined relatively low running speed.

At the same time, the forward end of the operating bar 49 will act through spring plate 61 upon the double switch 306–307 so as to throw the switches from their off-position to "on," more specifically from their full line position to dotted line one. Thus, currents will flow from conductor 101 through conductors 105 and 106 to take-up motor 17. Thence, currents flow through conductor 107, switch 311 (now occupying its full position shown in FIG. 11), conductor 108, now closed switch 307, conductor 109, switch S2, conductor 110, switch S3, conductor 103 and main switch 301 to plug 82, thereby the motor 17 being driven counter-clockwise in FIG. 11 as shown by a small arrow.

Simultaneously, current will also flow through conductors 100, 111, 112, and 113 to tape feed motor 13 for turning the latter clockwise as shown by a small arrow for the purpose of exerting on the tape feed reel 31 a slight braking torque for tensioning the tape T, while the return circuit of motor 13 is constituted by conductor 114, switch 308, conductor 115, switch 106, conductor 116, switch S1, conductor 117, switch S3, conductor 103, switch 301 to plug 82. This tape tension will cause the tension arm 43 to rotate a small angular distance about its pivot 44, more specifically from its idle position shown in FIG. 1 to its operating position shown in FIG. 2, thereby switch 309 being transferred from its ful-lined to dotted position shown in FIG. 11. In this way, relay coil 96 is fully energized and its contact 96a is caused to move from its full-lined "off"-position to dotted line "on" position. This, rectified current will be supplied from the aforementioned rectifier circuit through conductor 118 to plunger coil 72, thence returning therefrom through conductor 119, contact 96a and conductor 120 to the secondary winding element 91. By the energization of coil 72, switch 303 is turned "on." At the same time, plunger 73 and pin 74 are drawn downwards, thus occupying their lower position, which action will be well understood by comparison of FIG. 9 with FIG. 8, thereby transferring bar 152 from its non-locking to its locking position. Therefore, the push button P depressed manually in the aforementioned way, can be positively kept in its depressed position as shown by chain-dotted line in FIG. 6, and the play-back operation of the machine will be continued, until the stop control button S is depressed, or the tape T ends, breaks or unduly slackens. If considerable slack should take place in the tape T, the machine will automatically stop through the sensing operation of the tension arm 43, as will be more fully described hereinafter. At the initiation of the tape-winding in the aforementioned sense, a quick tightening operation will frequently take place which leads to considerable fluctuation in the turning movement of the tension arm. In this case, however, the pivotable arm 88 will be advancingly rotated in the aforementioned way and guide pin 89 will occupy a position in proximity of feeler pin **43*a* so that undue fluctuation of tape travel passage from the pin 43*a* to the spool 35 may be substantially suppressed. When stop push button S is depressed, the lock bar 152 will be brought from its locking position to its non-locking position through the intermediary of the stem 53′ of the button, thereby the operating bar 49 being caused to return to its initial position under the influence of return spring 69. In this case, the brake system is also shifted from its non-operating position to its applied position shown in FIG. 1. Thanks to the intentional provision of considerable play in the connecting linkage, the brake arm 14 at the tape feeding side is caused to return initially and then the brake arm 18 at the tape wind-up side will return to its applied position. By this means, disadvantageous slackening of the tape will be positively avoided. Other operational elements such as pressure roller arm 25*a*, switches 306–307** and the like are brought back to their initial position.

When fast forward push button F is depressed so as to advance the operating bar 55, the brake system including arm 14 and 18 is released as in the case of play control button P. In addition, switch 311 is operated through the intermediary of pin 58 and spring plate 59, thereby shifting from full-lined to chain-dotted line position in FIG. 11, thereby a feed circuit including conductors 112 and 107 and switch 311 is established so as to feed more current to the take-up motor 17. The pressure roller 40 is kept also in its disengaged position from the cooperating and rotating capstan 39. Therefore, the tape T is wound-up at a predetermined faster speed by the related reel 19. In this case, with the advancing movement of slide 200, the pivotable arm 88 with its tape guide pin 89 is brought into its operative position as already referred to hereinbefore. Therefore, undue fluctuation in the tape travel passage in the rear of feeler pin **43*a*** can be effectively prevented.

It is to be noted that whenever the brake system is released from its applied to its free position, switch 302 is caused to shift from its off-to "on"-position, thereby a by-pass circuit 124 across the main switch 301 is kept alive, provided that the tension arm 43 is sensing the tightened condition of the tape and thus the plunger-operated switch 303 is maintained in its closed position.

When rewinding button B is depressed, the operating bar 62 is equally advanced so as to release again the brake system from its applied position, and at the same time the pivotable arm 88 with tape guide pin 89 is brought to its operative position through the diagonal bar 201 as already referred to.

In addition, switch 308 is caused to shift from its full-line to its dotted line position in FIG. 11 so that, as will be easily understood, reverse current will be supplied to motor 13, thereby the tape T being rewound by the related tape reel 31 at a predetermined fast speed and in the reverse direction relative to the forward tape drive direction so far described.

When the tension arm 43 senses either a termination or a considerable slack of the tape regardless of the running direction thereof, the arm 43 is caused to swivel in the counter-clockwise direction when seen in FIG. 1, thereby switch 309 being returned from its dotted line to full-lined position shown in FIG. 11. In this case, however, a delay circuit formed across relay coil 96, comprising condenser 125 and resistor 126 will become effective so that the return of coil 96 from its fully energized to its partially energized condition will take place with a short time delay, say 1–2 seconds, and deenergization of plunger coil 72 will be invited according to the same operating principle.

Especially at the commencement of tape drive, regardless of the kind thereof, tension arm will generally be subjected to fluctuative oscillation. The provision of aforementioned time lag will be highly effective to avoiding frequent stoppage of the machine, on account of high sensitively of the tension arm. The time lag will further contribute to stop the machine only when the tape end has been completely wound-up by either tape reel, which action is especially predominant when the machine operates at a slower tape running speed as in the case of regular recording or reproducing operation of the machine. If necessary, record control button R may be linked to the brake system as well as to the pivotable arm 88, although not shown.

Even when the main switch 301 has been interrupted, the motor circuit will be kept alive, provided that there is a tape threaded in the regular way under tension, because, in this case, switches 302 and 303 are kept closed so that the by-pass circuit 124 is established across the main switch. Only when the tape has been completely wound-up by either tape reel, will power source be interrupted by the actuation of plunger coil 72 so as to open the related switch 303.

Resilient force to be exerted upon the pivotable arm 88, and thus shiftable tape guide pin 89, is supplied by returning coil spring 90 upon release of any of the brake-releasable push buttons F, P or B, or preferably also button R.

While the invention has been illustrated and described as embodied in a preferred embodiment, it is not intended to be limited to the specific embodiment shown, since various modifications and structural changes may be made without departing in any way from the spirit of the present invention.

What is claimed as new and desired to be secured by Letters Patent is:

1. A tape drive control mechanism for a magnetic tape recorder of the type including: a chassis panel; a tape reeling mechanism on the chassis panel, the tape reeling mechanism having a reversible tape feed turn disc driven by an electric motor coupled therewith, a reversible tape wind-up turn disc driven by an electric motor coupled therewith, a capstan driven by an electric motor coupled therewith, a pivotable arm carrying a pressure roller freely rotatable thereon positioned for selective frictional cooperation with the capstan, the capstan and pressure roller when brought into rolling frictional engagement with the tape therebetween feeding the tape at a constant speed; a brake mechanism on the chassis panel for selectively braking the turn discs, the brake mechanism having pivotable brake arms positioned for frictional braking engagement with the turn discs; a tape tension condition sensing arm pivotally mounted on the chassis panel in a position to contact the tape between the capstan and the wind-up disc for sensing slackening, braking, or termination of the tape; and a series of tape drive control push buttons carried by the chassis panel, the push buttons being connected by linkage to the brake mechanism for release of the brakes from selection braking engagement with the turn discs, and an electrical control circuit for the motors with improvements comprising: a manually controlled first switch electrically connected in the control circuit with at least one of the motors for interrupting the circuit thereto, a second switch in the control circuit actuated by the tape condition sensing tension arm when the tape tension condition sensing arm senses a slackening, braking, or termination of the tape, a time delay means in the control circuit connected with and actuated by the second switch, a by-pass circuit in the control circuit connected across the manual first switch, an electromagnet in the control circuit, the electromagnet having a plunger, a third switch in the by-pass circuit controlled by the plunger of the electromagnet, the electromagnet being connected in the control circuit so that it is instantly energized on closure of the manual first switch and de-energized through the time delay means to provide a short time lag when the tape tension condition sensing arm senses slackening, braking, or termination of the tape and actuates the second switch.

2. A tape drive control mechanism as in claim 1 further comprising: a pivotable tape fluctuation suppression arm mounted on the chassis panel; a return spring tensioned between the panel and the pivotable tape fluctuation suppression arm for resiliently urging the tape fluctuation suppression arm toward a position away from the tape between the capstan and the wind-up turn disc; a guide pin fixedly mounted on an end of the pivotable tape fluctuation suppression arm in proximity of the tape tension condition sensing arm, mechanical linkage means connecting the pivotable tape fluctuation suppression arm with the linkage of the drive control push buttons such that when any selected one of the tape drive control push buttons is operated for releasing the brake mechanism the pivotable tape fluctuation suppression arm is urged into contact with the tape on a side of the tape opposite the tape tension condition sensing arm to suppress undue fluctuation of the tape affecting the tape tension condition sensing arm.

3. A tape drive control mechanism as in claim 1 further comprising an elongated pivotable lock bar extending along and adjacent all of the push buttons, a return spring tensioned between the chassis panel and the lock bar, a pivotable release member operatively connected to the plunger and selectively engageable with the lock bar such that when the plunger is actuated the lock bar is positioned in non-locking condition on slackening braking or termination of the tape so that none of the push buttons can be locked in their actuated condition, and when the plunger is returned to its normal position the lock bar is brought into position for locking any actuated push button.

4. A tape drive control mechanism as in claim 1 further comprising a brake mechanism actuated switch in the by pass circuit, the brake mechanism actuated switch closing the circuit when the brake mechanism is released to thereby maintain the by pass circuit even after the manual first switch is opened for a time interval necessary to complete winding up of the tape by either motor driving the turn discs.

References Cited

UNITED STATES PATENTS 3,126,161 3/1964 Bemiss et al. ------ 242—55.12 X
3,092,344 6/1963 Dinsmore et al. ------ 242—55.12

LEONARD FORMAN, *Primary Examiner.*
R. A. FIELDS, *Assistant Examiner.*

U.S. Cl. X.R.

242—55.12